United States Patent

Virnig et al.

[11] Patent Number: 5,993,757
[45] Date of Patent: Nov. 30, 1999

[54] REOXIMATION OF METAL EXTRACTION CIRCUIT ORGANICS

[75] Inventors: Michael J. Virnig, Tucson, Ariz.;
Leroy Krbechek, Santa Rosa, Calif.;
Mary Casey, Bishopstown, Ireland

[73] Assignee: Henkel Corporation, Gulph Mills, Pa.

[21] Appl. No.: 09/027,063

[22] Filed: Feb. 20, 1998

Related U.S. Application Data

[60] Provisional application No. 60/039,604, Mar. 3, 1997.

[51] Int. Cl.$^6$ ............................ C22B 15/00; C22B 23/00; C22B 19/00
[52] U.S. Cl. ............................ 423/24; 423/99; 423/139; 423/DIG. 14
[58] Field of Search ................... 423/24, 99, 139, 423/DIG. 14; 564/259, 265, 266; 75/722

[56] References Cited

U.S. PATENT DOCUMENTS

| | | | |
|---|---|---|---|
| 3,428,449 | 2/1969 | Swanson | 75/117 |
| 3,655,347 | 4/1972 | Mattison et al. | 423/24 |
| 3,824,501 | 7/1974 | Harris | 333/18 |
| 3,867,506 | 2/1975 | Skarbo et al. | 423/139 |
| 3,952,755 | 4/1976 | Fisher | 132/161 |
| 4,005,173 | 1/1977 | Pemsler et al. | 423/24 |
| 4,020,105 | 4/1977 | Ackerley et al. | 260/566 |
| 4,020,106 | 4/1977 | Ackerley et al. | 260/566 |
| 4,029,704 | 6/1977 | Anderson | 260/566 |
| 4,031,139 | 6/1977 | Rapp et al. | 260/566 |
| 4,085,146 | 4/1978 | Beswick | 260/600 |
| 4,104,359 | 8/1978 | Davis et al. | 423/139 |
| 4,116,488 | 9/1978 | Hsueh et al. | 299/4 |
| 4,507,268 | 3/1985 | Kordosky et al. | 423/24 |
| 4,544,532 | 10/1985 | Kordosky et al. | 423/24 |
| 4,582,689 | 4/1986 | Kordosky | 423/24 |
| 4,978,788 | 12/1990 | Dalton et al. | 564/265 |
| 5,024,821 | 6/1991 | Greenshields et al. | 423/23 |
| 5,039,497 | 8/1991 | Weber et al. | 423/24 |
| 5,176,843 | 1/1993 | Dalton et al. | 252/184 |
| 5,281,336 | 1/1994 | Dalton et al. | 210/634 |
| 5,300,689 | 4/1994 | Krbechek et al. | 564/259 |
| 5,349,088 | 9/1994 | Krbechek | 564/259 |
| 5,378,262 | 1/1995 | Mihaylov et al. | 75/722 |
| 5,447,552 | 9/1995 | Mihaylov et al. | 75/722 |
| 5,488,161 | 1/1996 | Krbechek | 564/259 |
| 5,759,512 | 6/1998 | Rickelton et al. | 423/658.5 |

FOREIGN PATENT DOCUMENTS 1322532 7/1973 United Kingdom.

*Primary Examiner*—Steven Bos
*Attorney, Agent, or Firm*—Ernest G. Szoke; Wayne C. Jaeschke; Henry E. Millson, Jr.

[57] ABSTRACT

A process for purifying a degraded oxime metal extractant organic phase from a metal extraction circuit wherein a degraded oxime metal extractant organic phase comprised of an oxime metal extractant, and aldehyde or ketone degradates in a water immiscible hydrocarbon solvent is reoximated thereby restoring the oxime extractant organic phase for further extraction in the metal extraction circuit. Optionally the degraded organic phase may be purified by distillation prior to reoximation. The distillation is carried out in a wiped film evaporator at temperatures above 180° C. up to about 250° C. at a pressure from about 0.5 mm Hg or lower up to about 10 mm Hg and the reoximation is carried out with hydroxylamine in the presence of a weak organic carboxylic acid as a phase transfer catalyst and in the presence of an alkali metal or alkaline earth metal hydroxide or carbonate, preferably sodium carbonate.

39 Claims, No Drawings

REOXIMATION OF METAL EXTRACTION CIRCUIT ORGANICS

CROSS-REFERENCE TO RELATED APPLICATIONS

This application claims priority from U.S. provisional application Ser. No. 60/039,604, filed Mar. 3, 1997, the disclosure of which is incorporated herein by reference.

FIELD OF THE INVENTION

This invention relates to the reoximation of a degraded oxime extractant in the organic phase of an extraction circuit or system for recovery of a metal from an aqueous solution containing metal values, optionally with a purification step, such as distillation prior to reoximation, depending on the source, contaminants and the extent of the degraded organic. The organic phase in the extraction circuit is comprised of an oxime metal extractant dissolved in a water immiscible hydrocarbon solvent for extracting a metal from the aqueous solution containing the metal values. In the extraction system, particularly as practiced commercially, including recycle of the organic phase for reextraction, the oxime extractant in the organic phase of the system becomes degraded and requires regeneration for optimum continued operation. In addition the organic phase may be contaminated as well as degraded. Thus the present invention relates to an improvement in the process of extraction of a metal from an aqueous solution, the improvement comprising the reoximation and optionally, purification of the oxime extractant for the metal. Distillation will most typically be employed on the organic phase that is recovered from raffinate by coalescers or by skimming it off from ponds. It may also be an organic phase recovered from electrolyte by various coalescing devices before the electrolyte goes to the tankhouse for recovery of the metal. This organic phase is likely to be contaminated with other surface active materials which result in its being lost in this fashion from the circuit. Distillation helps to remove these impurities before oximation.

The typical metal extraction process employing a water insoluble oxime extractant for the metal dissolved in a water immiscible hydrocarbon solvent, such as kerosene, comprises contacting an aqueous solution containing the desired metal values with the organic phase comprised of a water insoluble oxime extractant dissolved in a water immiscible hydrocarbon solvent. After contact for a sufficient time to extract at least a portion of the metal values, the hydrocarbon solvent phase, now loaded or containing the extracted metal values, is separated from the aqueous solution phase from which the metal values have been extracted, due to the immiscibility of the organic and aqueous phases. The loaded organic phase is then typically contacted with an aqueous stripping solution thereby forming two phases again, (a) an aqueous strip phase, now containing metal values stripped from the organic extractant phase, and (b) an organic phase from which the metal values have been stripped. Again the organic and aqueous phases are separated due to immiscibility of the phases. The metal is then recovered from the metal loaded aqueous strip phase, by conventional means, such as electrowinning, precipitation or other means suitable to the particular metal, generally electrowinning being the preferred recovery means.

In the process the oxime extractant which was prepared by oximation of a carbonyl containing compound, such as, an aldehyde or ketone eventually undergoes slow hydrolysis under normal extraction circuit operation, breaking down into aldehyde or ketone, and the organic phase then contains oxime, ketone and or aldehyde degradation products (degradates), hydrocarbon solvent and other materials encountered such as equilibrium modifiers (typically various alcohols or esters) or kinetic additives which may have been added in the process.

To replace in whole, or in part, the organic phase extractant would require significant cost as well as reduced efficiency in the process due to shut down of the process during replacement.

DESCRIPTION OF THE INVENTION

In this description, except in the operating examples or where explicitly otherwise indicated, all numbers describing amounts of ingredients or reaction conditions are to be understood as modified by the word "about".

Briefly, the present invention is an improvement in the process of extraction of metals from aqueous solutions containing metal values in which the degraded circuit organic phase (extractant phase) is reoximated to again restore the effectiveness of the oxime extractant present in the organic phase.

In its broadest aspect the invention comprises (1) providing a degraded oxime organic extractant phase comprised of oxime extractant, the degraded aldehyde and ketone products, and water immiscible hydrocarbon solvent; (2) reoximating the degradation products to restore the oxime extractant; with (3) optional distilling to remove contaminants to purify and concentrate the degraded oxime extractant with its ketone and aldehyde degradation products (degradates).

Viewed from another aspect, the present invention is an improvement in the process of a metal extraction circuit wherein a water insoluble oxime extractant is employed to extract metal values from an aqueous solution, during the course of which extraction circuit the oxime breaks down, or degrades into aldehyde and ketone degradation products, the process of extraction circuit comprising (a) contacting an aqueous solution containing metal values with an organic extraction reagent comprised of a water insoluble organic oxime metal extractant dissolved in a water immiscible hydrocarbon solvent to extract the metal values from the aqueous solution to the oxime metal extractant forming an aqueous phase from which metal values have been removed and an organic phase to which the metal values have been transferred; (b) separating the aqueous and organic phases; (c) contacting the organic phase containing the metal values with an aqueous stripping solution to strip the metal values from the organic phase into the aqueous stripping solution; and (d) recovering the metal from the aqueous stripping solution; the improvement comprising (i) removing from the circuit at least a portion of the organic phase containing degraded oxime extractant, and the ketone and aldehyde degardation products of the oxime extractant, and (ii) reoximating the ketone and aldehyde degradation products to restore the degraded oxime extractant.

The present invention therefor provides a financially advantageous route to reoximate the oxime degradates in the organic phase restoring the effectiveness of the oxime as a metal extractant and if desirable, optionally (iii) distilling the stripped circuit organic prior to reoximation, to purify it from contaminants and concentrate the degraded oxime extractant with its ketone and aldehyde degradation products.

The amount of organic phase containing degraded oxime extractant removed from the extraction circuit for purification and reoximation will depend on the extent of the degradation to ketone and aldehyde and loss of effectiveness for extraction of the organic phase extraction reagent. In a commercial operation such as a continuous extraction process with recycling of the organic phase, the system will be monitored to determine the amounts of ketone and/or aldehyde present in the organic phase and a bleed stream of the stripped organic phase, will be removed for the reoximation of the oxime degradates, with or without optional distillation purification of the stripped organic phase. It may also be desirable to contact the organic extraction phase with an acidic aqueous solution, preferably a sulfuric acid aqueous solution, as a wash or scrub to remove any residual metals from the stripped organic phase prior to the distillation.

In the purification of the degraded oxime organic phase, the organic phase is distilled, preferably in a wiped film evaporator or a molecular distillation apparatus. The distillation is carried out at temperatures above about 165° C. and preferably between about 180° C., to about 250° C., more preferably above 200° C. to about 230° C., depending on the pressure. The pressures will typically be from 0.1 to about 5 mm of Hg with 0.5 to about 1.5 mm Hg being more preferred. On a laboratory scale pressures of about 0.5 to 1.5 mm Hg and lower may be employed. On a commercial scale, pressures will desirably be in the range of 10 mm Hg and lower, i.e. about 5 mm Hg or lower. In the distillation a very short distance is employed between the vaporization and condensing surfaces which are as close as possible. In practice the actual gap will be about 0.1 to about 10 times the mean free path of distilling molecules which is defined by kinetic theory. The residence time will be as short as possible to minimize any thermal degradation. In commercial operation it may be desirable to incorporate a heat exchanger to cool the distillate to less than 50° C. as quickly as possible, to minimize any thermal degradation.

The distillation may be carried out prior to the reoximation but need not be so, as the reoximation can be carried out equally well in the presence of unhydrolyzed oxime and any degradates which may be present. However, distillation is preferred to remove initially some of the hydrocarbon solvent and unhydrolyzed oxime as well as other volatile materials which may be present such as alcohol or ester equilibrium modifiers of any kinetic additives. In the distillation process it is preferred to remove from the organic circuit phase the bulk of the hydrocarbon solvent, i.e. the kerosene, and the unhydrolyzed oxime. To do so the distillation will typically be carried out in several passes in the wiped film evaporator, such as a Leybold Heraeus wiped film evaporator. In the first pass, preferably the temperature is about 210° C. at about 20 to 25 mm pressure, with a second pass at a pressure of about 1 to about 1.5 mm pressure. Under such distillation conditions there will be minimal, if any thermal decomposition of oxime or oxime degradate present.

The oximation of the ketone or aldehyde degradates is accomplished by oximation of the ketone and aldehyde degradate with hydroxylamine. The hydroxylamine is preferably employed in the form of a salt thereof, preferably the sulfate, halide (chloride or bromide), or phosphate and the like. The least expensive and most preferred is the sulfate. Raschig hydroxylamine may be employed, which is the raw product from the Raschig process for the production of hydroxylamine. Raschig hydroxylamine is a solution of hydroxylamine sulfate (about 11 weight %), ammonium sulfate (about 23 weight %), sulfuric acid (about 7.5 weight %) and water (about 58.5 weight %). The hydroxylamine, preferably the sulfate (hydroxylammonium sulfate), is employed in an amount of at least 1 equivalent to 1 equivalent of carbonyl in the oxime degradant (ketone and aldehyde), preferably in an excess. Thus the hydroxylamine will preferably be employed in an equivalents ratio of hydroxylamine to carbonyl greater than 1:1 up to about 10:1 and preferably about 3:1 to about 7:1 excess.

The reaction of the ketone and aldehyde degradant with hydroxylamine will be carried out in the presence of a catalytic amount of a phase transfer catalyst. The preferred acids employed as a phase transfer catalyst are the weak organic carboxylic acids, aliphatic or aromatic, containing about 4 to about 20 carbon atoms, most preferably about 6 to about 10 carbon atoms. The preferred acid is 2-ethylhexanoic acid. Other acids which may be employed are organo phosphorous and sulfonic acids. In some cases, where the oxime is employed in combination with an organo phosphorus, or sulfonic acid, it is not necessary to use a separate phase transfer catalyst. The phase transfer catalyst is employed in amounts from about 0.1 to about 0.5 moles of acid per mole of carbonyl, preferably from about 0.25 to about 0.4 moles acid/mole of carbonyl, with about 0.04 moles acid/mole of carbonyl being most preferred.

The reaction of the hydroxylamine with the carbonyl compounds (ketone or aldehyde) is conducted also in the presence of an alkali metal or alkaline earth metal hydroxide or carbonate (including bicarbonate). While sodium carbonate is preferred, the other alkali metal carbonates, such as potassium or lithium carbonate may be employed. Calcium carbonate is preferred as the alkaline earth metal replacement for sodium carbonate. The alkaline compound is employed in at least a stoichiometric amount to the hydroxylamine salt, i.e. at least 1 equivalent carbonate to 1 equivalent hydroxylamine salt, although a slight excess is preferred, from about 15 to about 50 excess. Thus the carbonate will preferably be employed in an equivalent ratio of carbonate to hydroxylamine greater than 1:1 up to about 1.5:1 and preferably about 1.1:1.

Some water should preferably be present, if only in a small amount sufficient to wet the surfaces of the hydroxylammonium sulfate and sodium carbonate crystals. If no water is present in the organic phase from the circuit operation, it may be added. As Raschig hydroxylamine sulfate contains water, no added water should be necessary. Preferably the water will be present in an amount of about 0.5 mole to 5 moles water/ mole of carbonyl with about 1 mole of water/ equivalent of carbonyl being most preferred.

The reaction to reoximation of the degradants may be conducted in the absence of solvent. However, the hydrocarbon solvent in the extraction reagent in the operation of the extraction circuit is preferred. Other hydrocarbon solvents such as toluene may be employed however, if desired.

The oximation reaction is complete, or substantially complete in about 5 to about 36 hours, dependent on the hydroxylamine excess and particular temperature of reaction employed. The operative temperature range may extend from about 35° to about 95° C. with about 50° to 95° being preferred.

In the extraction circuit, the oxime extractants for metals such as nickel, copper or zinc include hydroxyaryl oxime extractants of the hydroxy aryl aldoxime or hydroxy aryl ketone oxime type. A general formula for such oximes is formula shown below:

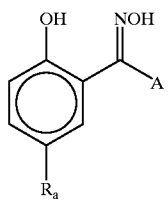

in which A may be:

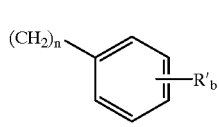

where R and R' may be individually alike or different and are saturated aliphatic groups of 1–25 carbon atoms, ethylenically unsaturated aliphatic groups of 3–25 carbon atoms or OR" where R" is a saturated or ethylenically unsaturated aliphatic group as defined; n is 0 or 1; a and b are each 0, 1, 2, 3, 4, with the proviso that both are not 0 and the total number of carbon atoms in $R_a$ and $R'_b$ is from 3 to 25, R'" is a saturated aliphatic group of 1–25 carbon atoms or an ethylenically unsaturated aliphatic group of 3 to 25 carbon atoms, with the proviso that the total number of carbon atoms in $R_a$ and R'" is from 3–25. Preferred compounds where A is (i) above are those in which a is 1, b is 0, R is a straight or branched chain alkyl group having from 7 to 12 carbon atoms and where R is attached in a position para to the hydroxyl group. Among those, the more preferred compounds are those wherein R'" is methyl and R and a are as designated. Compounds wherein n has a value of 0 (i.e. hydroxybenzophenone oxime compounds) may suitably be prepared according to methods disclosed in Swanson U.S. Pat. Nos. 3,952,775 and 3,428,449. By reason of ready solubility in organic diluents commonly employed in solvent extraction and desirable properties of complexes of the compounds with nickel preferred benzophenone compounds are those having a single alkyl group of 7–12 carbon atoms in a position para to the hydroxyl group, in which the alkyl group is a mixture of isomers. Examples of such compounds are 2-hydroxy-5-nonylbenzophenone oxime and 2-hydroxy-5-dodecylbenzophenone oxime, which are obtained as mixtures of the isomeric forms when commercial nonylphenol and dodecylphenol are respectively employed in their synthesis.

Compounds wherein n has a value of 1 (i.e. hydroxy phenyl benzyl ketone oxime compounds) may suitably be prepared according to methods described in Anderson U.S. Pat. No. 4,029,704. Preferred phenyl benzyl ketone oximes like the above noted benzophenone oximes are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of the hydroxy phenyl alkyl ketone oxime type may suitably be prepared according to the procedures disclosed in UK Patent 1,322,532. As noted with regard to the benzophenone and phenyl benzyl ketone compounds noted above, the preferred compounds of this type are also those having an isomeric mixture of 7 to 12 carbon alkyl groups as a single substituent on the ring para to the hydroxyl group. Also preferred are those in which the R'" alkyl group is methyl. Illustrative of such preferred compounds where A is $C_6H_5$, $CH_3$ is 2-hydroxy-5-nonylphenyl methyl ketone oxime manufactured through the use of commercial nonylphenol.

Hydroxy aryl aldoxime extractants which are employed are those in which A is H. These hydroxy benzaldoximes, (also called "salicylaldoximes"), may suitably be prepared according to methods described in Ackerley et al U.S. Pat. Nos. 4,020,105 or 4,020,106 or by oximation of aldehydes prepared according to Beswick U.S. Pat. No. 4,085,146. Again preferred compounds are those having an isomeric mixture of isomeric 7 to 12 carbon alkyl groups as a single substituent para to the hydroxyl group mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are preferred, the most preferred for the purposes of the present invention where A is H, being the nonyl and dodecyl compounds.

Reagents may include a single extractant chemical as illustrated above or may comprise mixtures of different aldoxime or ketoxime extractants of the type illustrated in U.S. Pat. Nos. 4,507,268, 4,544,532 and 4,582,689.

Oxime extractants other than the hydroxy aryl oximes which find utility as metal extractants are aliphatic oximes such as those hydroxy alkyl oximes shown in U.S. Pat. No. 3,824,501. A preferred aliphatic hydroxy alkyl oxime is 5,8-diethyl-7-hydroxy dodecan-6-oxime (LIX™ 63, available commercially from Henkel Corporation) employed in certain extraction systems for recovery of nickel, in admixture with an acid, such as di-2-ethylhexylphosphoric acid.

As indicated earlier, the oxime reagent which is water insoluble, is dissolved in a water-immiscible liquid hydrocarbon solvent and the resulting organic solution is contacted with the metal containing aqueous phase to extract at least a portion of the metal values into the organic phase. The phases are then separated and the metal values are stripped from the loaded organic (LO) phase by use of an aqueous stripping medium. Prior to stripping, it is not unusual to wash the organic phase, particularly where trace metals may be loaded on the organic extractant. One or more wash stages may accordingly be employed depending on any trace metals present, the amount of entrainment and the required purity of the final metal loaded stripping solution.

In the process of extraction a wide variety of water immiscible liquid hydrocarbon solvents can be used in the copper recovery process to form the organic phase in which the diketone extractant is dissolved. These include aliphatic and aromatic hydrocarbon diluents such as kerosene, benzene, toluene, xylene and the like. A choice of essentially water-immiscible hydrocarbon solvents or mixtures thereof will depend on factors, including the plant design of the solvent extraction plant, (mixer-settler units, extractors) and the like. The preferred solvents for use in the present invention are the aliphatic or aromatic hydrocarbons having flash points of 130° Fahrenheit and higher, preferably at least 150° and solubilities in water of less than 0.1% by weight. The solvents are essentially chemically inert. Representative commercially available solvents are CHEVRON™ ion exchange solvent (available from Standard Oil of California) having a flash point of 195° Fahrenheit; ESCAID™ 100 and 110 (available from Exxon-Europe) having a flash point of 180° Fahrenheit; NORPAR™ 12 (available from Exxon-USA) with a flash point of 160° Fahrenheit; CONOCO™ C1214 (available from Conoco) with a Flash Point of 160° Fahrenheit and C 170 exempt solvent having a Flash Point above 150° F.; and Aromatic 150 (an aromatic kerosene available from Exxon-USA having a flash point of 150° Fahrenheit), and other various kerosene and petroleum fractions available from other oil companies, such as the ORFORM™ SX series of solvent extraction diluents (available from Phillips 66: SX 1, 7, 11, and 12 each having a Flash Point above 150° F. varying up to 215° F.); and ESCAID™ series of hydrocarbon diluents (available from Exxon: 100, 110, 115, 120, 200 and 300, each having a Flash Point above 1500 F.; and EXXOL™ D80 solvent (also available from Exxon and having a Flash Point above 150° F.);

In the process, the volume ratios of organic to aqueous (O:A) phase will vary widely since the contacting of any quantity of the oxime organic solution with the metal containing aqueous solution will result in the extraction of metal values into the organic phase. For commercial practicality however, the organic(O) to aqueous(A) phase ratios for extraction are preferably in the range of about 50:1 to 1:50. It is desirable to maintain an effective O:A ratio of about 1:1 in the mixer unit by recycle of one of the streams. In the stripping step, the organic:aqueous stripping medium phase will preferably be in the range of about 1:4 to 20:1. For practical purposes, the extracting and stripping are normally conducted at ambient temperatures and pressure although higher and lower temperatures and pressures are entirely operable. It is preferable to strip at elevated temperatures. While the entire operation can be carried out as a batch operation, most advantageously the process is carried out continuously with the various streams or solutions being recycled to the various operations in the process for recovery of the metal, including the leaching, extraction and the stripping steps.

In the extraction process, the organic solvent solutions may contain the oxime extractant typically in an amount of about 20–30% by weight, generally on a volume/volume percentage (v/v%) with respect to the solvent of about 10–40 v/v%, typically about 10–30 v/v%.

After stripping of the metal values from the organic phase by the aqueous stripping solution and separation of the organic and aqueous stripping phase, the metal may be recovered by conventional recovery processes, including, but not limited to, precipitation and electrowinning. Electrowinning is typically the preferred means of recovery of the metal from solutions suitable for electrowinning, generally highly acidic aqueous solutions, such as a sulfuric acid solution containing greater than about 5 to about 200 g/l sulfuric acid, dependent on the particular metal, which is preferred as the aqueous acidic stripping solution to remove the metal values from the organic phase.

It is at this step the stripping step that the extraction reagent organic circuit phase which has degraded is removed from the extraction circuit after stripping for reoximation, prior to recovery of the metal from the stripping solution, with an optional scrub or wash step as noted earlier to remove any residual metals from the organic phase prior to reoximation and optional purification distillation where necessary or desirable.

The invention can be further illustrated by means of the following examples.

EXAMPLE I

In this example a circuit organic kerosene distillate fraction was employed which contained by weight about 3% nonylphenol; 8% 2-hydroxy-5-nonylacetophenone (HNA); a low level of about 1% of 2-hydroxy-5-nonylacetophenone oxime (HNAO); 2–10% tridecanol and unknown compounds. A mixture of about 6.6 kg of circuit organic kerosene distillate, 243 g (1.5 moles) of hydroxylamine sulfate, 180 g of sodium carbonate (1.7 moles), 15 g of 2-ethylhexanoic acid (0.1 mole) and 27 g of water (1.5 moles) was stirred at room temperature for about 65 hr. The reaction mixture contained about 3.2% unreacted HNA. After an additional 4 hr at 50° C. the mixture contained about 2.4% unreacted HNA. An additional 162 g of hydroxylamine sulfate (1.0 mole) 120 g of sodium carbonate (1.13 moles) and 18 g of water (1.0 mole) were added and the reaction held at 75° for 18 hr. No residual HNA was detected by thin layer chromatography, which can readily detect 0.1% HNA in such a mixture. The reaction mixture was washed twice at 50–60° C. with about 1.5 liter of wash water per wash. The organic phase now reoximated, loads 8.11 g. of copper per liter, which demonstrates that it is a suitable metal extractant after reoximation and purification.

In the above oximation example of a circuit organic phase from an extraction of nickel circuit employing a kerosene solution of HNAO as the extractant, the bulk of the kerosene and HNA were removed from the circuit organic by distillation on a wiped film evaporator at 210° C. at 20–25 mm pressure. The HNAO residual HNA and kerosene were distilled from the above residue fraction with a second pass at 210° C. at 1–1.5 mm pressure. In the second distillation, the 1100 g fraction which contained the HNAO (about 64% and the kerosene fraction which contained the residual HNA and low level of HNAO were collected separately from the 865 g of viscous residue(37% HNAO). There appeared to be minimal if any decomposition of HNA or HNAO under these distillation conditions. The combined kerosene fractions (6.6 kg) were the feedstock for the oximation described above.

The prior removal of kerosene and HNA does not appear to be a requirement and the oximation would proceed equally well in the presence of unhydrolyzed 2-hydroxy-5-nonylacetophenone oxime (HNAO) and any degradates which may be present.

EXAMPLE 2

A synthetic degraded organic phase was prepared by addition of HNA to a solution containing 20% (v/v) 2-hydroxy-5-nonylacetophenone oxime in SHELLSOL™ D70 (an aliphatic diluent from Shell Chemical having a Flash Point of 70° C. (158° F.), to give an organic containing 2.8% HNA. Portions (300 ml) of this organic were placed three neck round bottom flasks fitted with a stirrer and condenser along with 20 g of sodium carbonate, 15 g. of hydroxylamine sulfate, 1.4 ml of 2-ethylhexanoic acid and 10 ml of water. Oximations were then carried out at 60° C. and at 45° C. Samples were removed at various times and analyzed for unreacted HNA by thin layer chromatography. At 60° C. 0.6% HNA remained after 17.5 hr. and 0.3% after 22 hr. at 45° C., 0.74% remained after 27 hr., 0.5% after 32 hr. and 0.3% after 42 hr. After 22 hr. at 60° C., water was added to the reaction mixture and the phases allowed to separate after stirring. The organic was then washed with water a final time and then diluted with additional SHELLSOL D70 to give the equivalent of 10% (v/v) HNAO).

The resultant organic was then tested under typical standard extraction quality control protocol (extraction circuit) and found to be fully acceptable in terms of copper loading, phase separation, extraction kinetics, and strip kinetics.

While the reoximation and purification of the present invention has been illustrated with an oxime extractant 2-hydroxy-5-nonylacetophenone oxime and its degradates, the method is equally applicable to other oxime extractants such as the salicylaldoximes and other ketoximes noted earlier, such as benzophenone oximes typically employed as extractants for metals such as nickel, copper and zinc. As also noted earlier the reoximation is also applicable to degradates of aliphatic hydroxy alkyl oxime extractants such as, 5,8-diethyl-7-hydroxydodecan-6-oxime.

What is claimed is:

1. A process of reoximating and restoring a degraded oxime metal extractant organic phase from a metal extraction circuit comprising:
    (a) providing a degraded oxime metal extractant organic phase comprised of an oxime metal extractant, aldehyde or ketone or both aldehyde and ketone degradates thereof and a water immiscible hydrocarbon solvent;
    (b) distilling the degraded oxime metal extravagant organic phase at a temperature above about 165° C. and
    (c) reoximating the degradates thereby restoring the oxime extractant for further extraction in the metal extraction circuit.

2. A process as defined in claim 1, wherein the degraded oxime metal extractant organic phase is provided by bleeding at least a portion of the organic phase stream of the metal extraction circuit.

3. A process as defined in claim 2, wherein the bleed stream is withdrawn from the extraction circuit after stripping of the metal values contained in the organic phase with an aqueous stripping solution.

4. A process as defined in claim 1, wherein the degraded oxime extractant organic phase is provided from raffinate or electrolyte stages of the extraction circuit.

5. A process as defined in claim 1, wherein the metal is selected from the group consisting of nickel, copper and zinc.

6. A process as defined in claim 1, wherein the distillation is carried out in a wiped film evaporator at a temperature above about 165° C. up to about 250° C. and a pressure of up to about 10 mm Hg.

7. A process as defined in claim 1, wherein the distillation is carried out in two passes in a wiped film evaporator wherein the first pass is carried out at a temperature of about 200° C. at about 20–25 mm pressure with a second pass at a pressure of about 1 to about 1.5 mm pressure.

8. A process as defined in claim 1, wherein the reoximation comprises reacting the degradates in the degraded oxime metal extractant phase with hydroxylamine in the presence of a catalytic amount of a phase transfer catalyst.

9. A process as defined in claim 8, wherein the hydroxylamine is employed in an equivalents ratio of hydroxylamine to carbonyl of the degradates of greater than 1:1 to about 10:1.

10. A process as defined in claim 8, wherein the phase transfer catalyst is a weak organic carboxylic acid containing from 4 to about 20 carbon atoms.

11. A process as defined in claim 10, wherein the carboxylic phase transfer catalyst is selected from the group consisting of aliphatic and aromatic acids containing from 6 to 10 carbon atoms.

12. A process as defined in claim 10 wherein the weak organic phase transfer catalyst is employed in an amount of up to about 0.5 moles of acid per mole of carbonyl of the degradates.

13. A process as defined in claim 12, wherein the amount of carboxylic phase transfer catalyst is employed in an amount of about 0.25 to about 0.4 moles of acid per mole of carbonyl.

14. A process as defined in claim 8, wherein the reoximation is conducted in the same hydrocarbon solvent as employed in the extraction circuit in the organic phase containing the oxime extractant.

15. A process as defined in claim 14, wherein the hydrocarbon solvent in which the reoximation is conducted is kerosene.

16. A process as defined in claim 1, wherein the oxime extractant is an hydroxy aryl oxime having the formula:

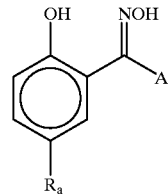

in which A is:

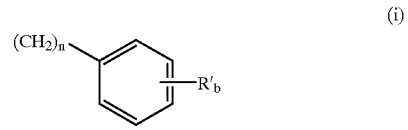

(ii) R''' or
(iii) H where R and R' can be individually alike or different and are saturated aliphatic groups of 1–25 carbon atoms, ethylenically unsaturated aliphatic groups of 3–25 carbon atoms or OR" where R" is a saturated or ethylenically unsaturated aliphatic group as defined; n is 0 or 1; a and b are each 0. 1, 2. 3, or 4, with the proviso that both are not 0 and the total number of carbon atoms in $R_a$ and $R'_b$ is from 3 to 25, R''' is a saturated aliphatic group of 1–25 carbon atoms or an ethylenically unsaturated aliphatic group of 3 to 25 carbon atoms, with the proviso that the total number of carbon atoms in $R_a$ and R''' is from 3–25.

17. A process as defined in claim 16, wherein the hydroxy aryl oxime is selected from the group consisting of 2-hydroxy-5-nonylbenzophenone oxime, 2-hydroxy-5-dodecylbenzophenone oxime, 2-hydroxy-5-nonylphenyl benzyl ketone oxime, 2-hydroxy-5-heptyl benzaldoxime, 2-hydroxy-5-octyl benzaldoxime, 2-hydroxy-5-nonyl benzaldoxime, 2-hydroxy-5-dodecyl benzaldoxime, and 2-hydroxy-5-nonylacetophenone oxime.

18. A process as defined in claim 16, wherein the oxime extractant is 2-hydroxy-5-nonylacetophenone oxime.

19. A process as defined in claim 1 wherein the oxime extractant is an aliphatic hydroxy alkyl oxime.

20. A process as defined in claim 19, wherein the aliphatic hydroxy alkyl oxime is 5,8-diethyl-7-hydroxydodecan-6-oxime.

21. In a process of a metal extraction circuit wherein a water insoluble oxime metal extractant dissolved in a water immiscible hydrocarbon solvent is employed to extract metal values from an aqueous solution containing metal values, the process of the extraction circuit comprising:
    (a) contacting an aqueous solution containing metal values with an organic extraction reagent comprised of the water insoluble oxime metal extractant dissolved in the water immiscible hydrocarbon solvent to extract the metal values from the aqueous solution to the organic extraction reagent thereby forming an aqueous phase from which the metal values have been removed and an organic phase to which the metal values have been transferred;

(b) separating the aqueous and organic phases;

(c) contacting the organic phase to which the metal values have been transferred with an aqueous stripping solution to strip the metal values from the organic phase to the aqueous stripping solution; and (d) recovering the metal from the aqueous stripping solution; the improvement comprising:

(i) removing from the extraction circuit at least a portion of the organic phase containing degraded oxime extractant and the aldehyde and/or ketone degradates thereof; and (ii) distilling at a temperature above about 165° C. and reoximating the organic phase containing the degradates of the oxime extractant;

whereby the degraded organic circuit phase is purified and reoximated to restore the effectiveness of the oxime extractant present in the organic extractant phase.

22. A process as defined in claim 21, wherein the portion of the organic phase containing degraded oxime extractant in step (i) above is withdrawn from the extraction circuit after stripping of the metal values contained in the organic phase with an aqueous stripping solution.

23. A process as defined in claim 21, wherein the metal is selected from the group consisting of nickel, copper and zinc.

24. A process as defined in claim 21, wherein the oxime metal extractant organic phase is distilled prior to reoximation of the degradates present therein.

25. A process as defined in claim 24, wherein the distillation is carried out in a wiped film evaporator at a temperature above 180° C. up to about 250° C. and a pressure of up to about 10 mm Hg.

26. A process as defined in claim 24, wherein the distillation is carried out in two passes in the wiped film evaporator wherein the first pass is carried out at a temperature of about 200° C. at about 20–25 mm pressure with a second pass at a pressure of about 1 to about 1.5 mm pressure.

27. A process as defined in claim 21, wherein the reoximation comprises reacting the degradants in the degraded oxime metal extractant phase with hydroxylamine in the presence of a catalytic amount of a phase transfer catalyst.

28. A process as defined in claim 27, wherein the hydroxylamine is employed in an equivalents ratio of hydroxylamine to carbonyl of the degradant of greater than 1:1 to about 10:1.

29. A process as defined in claim 27, wherein the phase transfer catalyst is a weak organic carboxylic acid containing from 4 to about 20 carbon atoms.

30. A process as defined in claim 29, wherein the carboxylic phase transfer catalyst is selected from the group consisting of aliphatic and aromatic acids containing from 6 to 10 carbon atoms.

31. A process as defined in claim 30, wherein the weak organic phase transfer catalyst is employed in an amount of up to about 0.5 moles of acid per mole of carbonyl of the degradant.

32. A process as defined in claim 31, wherein the amount of carboxylic phase transfer catalyst is employed in an amount of about 0.25 to about 0.4 moles of acid per mole of carbonyl.

33. A process as defined in claim 21, wherein the reoximation is conducted in the same hydrocarbon solvent as employed in the extraction circuit in the organic phase containing the oxime extractant.

34. A process as defined in claim 33, wherein the hydrocarbon solvent in which the reoximation is conducted is kerosene.

35. A process as defined in claim 21, wherein the oxime extractant is an hydroxy aryl oxime having the formula:

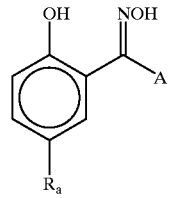

in which A is:

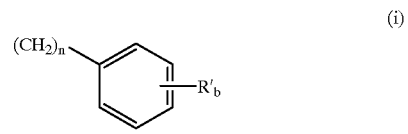

(ii) R''' or (iii) H where R and R' can be individually alike or different and are saturated aliphatic groups of 1–25 carbon atoms, ethylenically unsaturated aliphatic groups of 3–25 carbon atoms or OR'' where R'' is a saturated or ethylenically unsaturated aliphatic group as defined; n is 0 or 1; a and b are each 0, 1, 2, 3, or 4, with the proviso that both are not 0 and the total number of carbon atoms in $R_a$ and $R'_b$ is from 3 to 25, R''' is a saturated aliphatic group of 1–25 carbon atoms or an ethylenically unsaturated aliphatic group of 3 to 25 carbon atoms, with the proviso that the total number of carbon atoms in $R_a$ and R''' is from 3–25.

36. A process as defined in claim 35, wherein the hydroxy aryl oxime is selected from the group consisting of 2-hydroxy-5-nonylbenzophenone oxime, 2-hydroxy-5-dodecylbenzophenone oxime, 2-hydroxy-5-nonylphenyl benzyl ketone oxime, 2-hydroxy-5-heptyl benzaldoxime, 2-hydroxy-5-octyl benzaldoxime, 2-hydroxy-5-nonyl benzaldoxime, 2-hydroxy-5-dodecyl benzaldoxime, and 2-hydroxy-5-nonylacetophenone oxime.

37. A process as defined in claim 21, wherein the oxime extractant is 2-hydroxy-5-nonylacetophenmone oxime.

38. A process as defined in claim 21, wherein the oxime extractant is an aliphatic hydroxy alkyl oxime.

39. A process as defined in claim 38, wherein the aliphatic hydroxy alkyl oxime is 5,8-diethyl-7-hydroxydodecan-6-oxime.

* * * * *